United States Patent [19]
Fressineau et al.

[11] 3,959,783
[45] May 25, 1976

[54] CONTROL STORE UNIT ADDRESSING DEVICE

[75] Inventors: Jean-Louis Fressineau, Les Clayes-sous-Bois; Maurice Hubert, Versailles; Pierre Hoffmann, Mere, all of France

[73] Assignee: Compagnie Internationale pour l'Informatique, Louveciennes, France

[22] Filed: Dec. 13, 1974

[21] Appl. No.: 532,684

[30] Foreign Application Priority Data
Dec. 27, 1973 France .............................. 73.46459

[52] U.S. Cl. ..................... 340/173 BB; 340/172.5; 340/173 R
[51] Int. Cl.² ..................... G11C 29/00; G11C 8/00
[58] Field of Search ....... 340/173 BB, 173 R, 172.5, 340/173 SP

[56] References Cited
UNITED STATES PATENTS

| | | | |
|---|---|---|---|
| 3,422,402 | 1/1969 | Sakalay .......................... | 340/173 BB |
| 3,588,830 | 6/1971 | Duda et al. ..................... | 340/173 BB |
| 3,659,275 | 4/1972 | Marshall ........................ | 340/173 BB |
| 3,755,791 | 8/1973 | Arzubi ........................... | 340/173 BB |

*Primary Examiner*—Stuart N. Hecker
*Attorney, Agent, or Firm*—Kemon, Palmer & Estabrook

[57] ABSTRACT

An addressing device is described for a control store comprised of a read-only storage portion and a read-write storage portion, each divided in addressable microprogram sectors and both accessible through a common address register and accessing to a common read-out register. Said control store is a part of a multimicroprogrammed unit further comprising a logical unit, a status register for said logical unit and an automatic store address forming organization operating on data supplied from the common read-out register and the logical unit. When a microprogram stored in a sector of the read-write storage portion must be substituted for a microprogram stored in a sector of the read-only storage portion, the logical unit forces into the status register, a pointer code and the sector addresses of the concerned read-only and read-write storage portions. The pointer code validates comparing means of the sector address code of the read-only storage portion of said status register and the sector address code outputting said organization and the identity output signal from the comparing means, controls substitution in the common address register of the read-write code of the status register for the sector address code outputting said organization.

4 Claims, 1 Drawing Figure

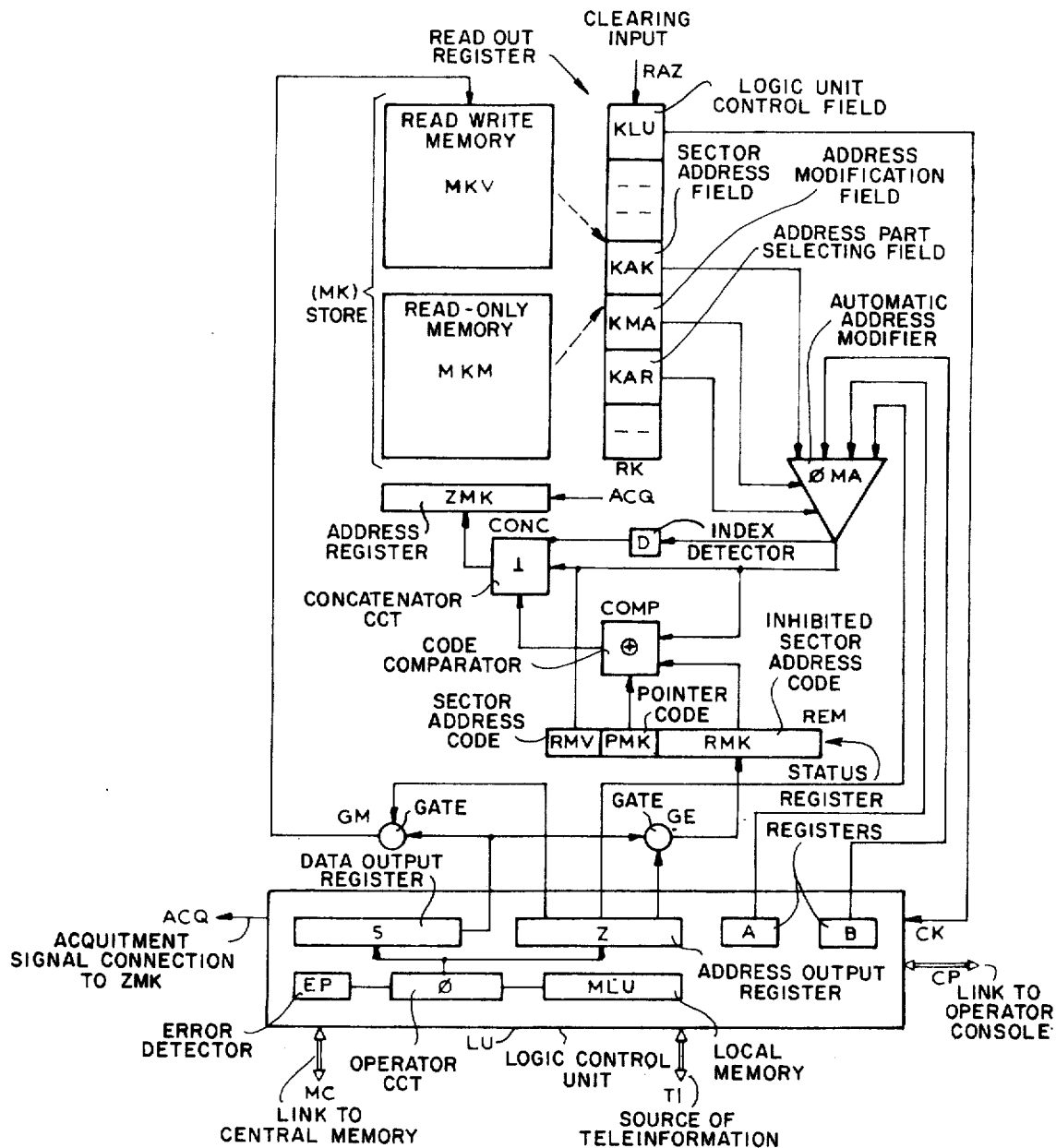

CONTROL STORE UNIT ADDRESSING DEVICE

BACKGROUND OF THE INVENTION

The present invention concerns improvements in or relating to information processing units which operate in a multiprogrammed fashion and wherein a microprogram control store comprises both a read-only storage portion and a read-write storage portion, each portion being organized in "pages" or sectors. Predetermined microprograms are stored permanently into the read-only storage portion. On the other hand, further microprograms may be introduced into the read-write portion of the control store during execution of a task on either a machine decision or a human decision. The human decision will mainly come from an operator's console to which a microprogramming error is signalled for a microprogram sector of the read-only storage portion of the unit. The machine decision may be motivated both by the necessity for recourse to an additional microprogramme which does not exist in the read-only storage portion of the control store and by the detection of an error in a sector of the read-only storage portion of the store. Any intervening decision will temporarily interrupt the execution of the task and introduce the requested additional or amended microprogram portion into an addressed sector of the read-write storage portion of the control store.

In such multi-microprogrammed units, it is conventional to provide an automatic organization for the progression of the addresses of the control store. Each control word read-out from the store includes a part pointing at the address sector of the next word to be read into the central store and, when needed, it further includes a part pointing a modification in the chaining of the store addresses. The control store is operatively associated with a logic unit. An input of the logic unit is fed with data from the read-out register, as for instance a data concerning the address of the stored word just read out. From such data from the read-out register and the logical unit (responsive to the data it has just received from the read-out register), a control store address is formed by an organization to the inputs of which said data are applied and which is provided with an output to the common address register of the control store. The thus formed new address then controls the next read-out of a control word from the store.

BRIEF DESCRIPTION OF THE INVENTION

The object of the invention is to provide a control store addressing device which ensures automatic passage from the read-only storage portion of the control store to the read-write storage portion thereof in the course of execution of a task by the multi-microprogrammed unit.

A further object of the invention is to design the store addressing circuit so that it does not necessitate any change of the automatic store address organization and merely adds a little hardware to the structure of the unit.

In such a unit, it is already known to provide status registers, associated with and controlled from the logical unit which generates words describing the progress of the task and ensures memorization of such words into such status registers. It is a further object of the invention to acquire the advantage of the presence of such status registers and their control from the logical unit.

In accordance with one embodiment of the invention, a control store addressing device is provided which comprises the combination of means controlled from the logical unit for writing into such a status register the following information: a pointer code, a read-only storage sector address code and a read-write storage sector address code when, during execution of a task, a microprogram in this addressed sector of the read-write storage portion of the control store must be substituted for a microprogram in this addressed sector of the read-only storage portion. The pointer code activates comparing means of the read-only sector address in said status register and the read-only sector address outputting from the automatic address forming organization and, when said comparing means detects identity, responsive means are activated for substituting the read-write sector address code of the status register for the read-only sector address code from the organization.

DESCRIPTION OF THE DRAWINGS

An illustrative embodiment of a multi-microprogrammed unit embodying the invention is shown in the single FIGURE of the accompanying drawings.

DETAILED DESCRIPTION

In the drawing, only those components are shown which are useful for explaining the invention. Each component, per se, is of common knowledge in the art. The logic unit LU is shown restricted to its arithmetic/logic operator $\phi$ provided with two output registers, as conventional, S for the data and Z for the addresses. The operator operates with recourse to the internal store MLU and is provided with its usual error detector circuits EP. The logic unit LU further comprises a number of data registers, two of which, A and B are illustratively shown as assumed to provide data to the automatic address modification organization of the shown multi-microprogrammed processor unit.

The logic unit LU may exchange data both ways with a central store through the link shown at MC, with a teleinformation source through the link shown at TI and with an operator's control console through the link shown at CP. It further issues acquitment signals ACQ of the microprogrammes it processes.

The control store (MK) comprises two storage portions, MKM and MKV which are both associated with a common address register ZMK and a read-out register RK. The storage portion MKM is a "dead" one, i.e. a read-only memory. The storage portion MKV is a "live" one, i.e. a read-write memory. It may be noted that ZMK is shown external to the logic unit LU for the sake of clarity of the drawing, but actually in most cases it will be internal to said logic unit and even, in certain cases, a part of the register Z of said unit. The read-out register RK is provided with a clearing input RAZ activated at each beginning of execution of a task. At each step of each task, it receives from the control store (MK) a complete word, only the fields of which useful for the description of the invention are shown. The field KLU of the register has an output to a control input CK of the logic unit LU for execution of the microinstructions represented by the control words in RK. The field KAK has an output representing the sector address code of the word to be next introduced winthin RK. The field KMA has an output controlling the address modification operator $\phi$MA. The field KAR has an output controlling the selection of that part of the address to be modified. Actually, the codes in KMA, chaining of the addresses and in KAR together constitute the control of the address modification operator $\phi$MA which may be of the multiplexer kind, which combines the code read from KAK to the code from a register of the logic unit which may contain an address useful for execution of a microprogramme. Such registers are Z, A and B. It may for instance be assumed that the code read from KMA selects the appropriate one of the said three registers for the formation of a read-out address for (MK) whereas th code read from KAR controls the selection of the content of the register Z for a write-in operation into MKV of a word available within the register S. In this last condition, the address from Z is placed within ZMK under the control of $\phi$MA and decoding of a part of the address in Z unblocks the gate GM inserted between S and the data input of MKV. The code in KAR thus constitutes a pointer to a write-in operation into MKV as an operation of a microprogramme which is executed by the unit. Such conditions are met for instance when a microprogramme must be written into a sector of the read-write storage portion MKV of the control store as a substitute of a faulty microprogramme in the read-only storage portion of the store.

The substitute microprogramme may be obtained by the logical unit LU from either the central memory MC or the source of teleinformation TI. The decision is reached on activation of the error detector circuits EP characteristic of a programming error in a sector of MKM. The activation of EP generates an interrupt in the execution of the microprogramme, as conventional per se, and the decision of introducing a substitute into MKV may be automatically reached by operation of the logical unit LU or by an order brought by CP from the operator's desk or console. As known, a logic unit such as LU includes one or more status registers and such registers are automatically loaded and unloaded by the very operation of the logic unit, as a task is progressing therethrough. According to the invention, use is made of one of the said status registers and, for the sake of clarity, this status register is shown at REM external to the logic unit LU of which it actually is a part. When a substitute microprogramme is loaded into MKV, the logic unit introduces within the status register REM the following data: the sector address code RMV of the read-only storage portion MKM of the sector of MKM which thereafter will be of forbidden accessing; — a pointer code PMK the configuration of which marks a MKM sector interdiction; — the sector address code RMV of the sector of MKV into which is being written the substitute microprogramme. These data are introduced into the status register REM as they appear in the data register S of the logic unit LU and are routed to REM through a gate GE which is unblocked by decoding a part of the content of the address register Z of the unit LU. The sector address RMK is known by LU as being the one for which the activation of EP had interrupted the execution of the task. The sector address RMV is known by LU as being the address of the first available sector of MKV at the instant of the substitution (for instance, the addresses of the available sectors of MKV are previously stored in one of the status registers of the unit).

A comparator circuit COMP receives on a first input the sector address code of the part RMK of the status register REM and on a second input the sector address code existing in any address code outputting the address modifier circuit $\phi$ MA. When validated by the presence of the pointer code PMK, which in most cases may be a single bit code, the comparator circuit COMP will issue an identity signal when both the sector address codes from REM and $\phi$MA coincide. Validation means either unblocking of the comparator or unmasking of its output. The address from $\phi$MA passes through a further address modification circuit CONC which, when activated by the identity signal outputting from COMP, substitutes the sector address code RMV from the status register REM for the read-only sector address code existing in the output of $\phi$MA. The circuit CONC may be a concatenation operator which, when activated by the output of COMP, ensures the concatenation of the sector address code RMV to the address of the rank of the microinstruction issuing from $\phi$MA. In other words, the circuit CONC may be a multiplexer for substituting RMV for RMK in the word address code finally introduced into ZMK.

This arrangement implies that the sector address codes do not correspond from the read-only storage portion to the read-write storage portion of the control or command store (MK). When the programming is such that sector addresses may correspond from the read-only storage portion to the read-write storage portion, the addresses are distinguished as known by the addition of a tag code, which may be a single bit, the value of said tag code defining the storage portion of the storage which points to the address. In such a case, the address modification in CONC will also modify the tag code, and the comparator COMP may receive the tag code form $\phi$MA and RMK in order to avoid undue operation of the CONC circuit when the sector address code from $\phi$MA is already an address code pointing to MKV. However it is thought simpler that the comparator COMP only compare sector address codes proper and the tag code from $\phi$MA be decoded at D and, when a tag code pointing to MKV, blocks the operation of the circuit CONC as having its output connected to an inhibiting input of CONC.

When the arrangement is such that only one sector of the read-write storage portion of (MK) can be used for a substitute microprogramme, it is advantageous to decide that this sector of MKV be the sector of a zero (all zeros) address code. In such a case, RMV is zero and the circuit CONC only comprises a transfer circuit of any sector address code issuing from $\phi$MA and the identity signal from COMP merely blocks said transfer circuit.

As shown in the drawing, the common store address register ZMK can not be loaded until it receives the acquitment signal ACQ from the logic unit LU.

What is claimed is:

1. In a multi-microprogrammed unit comprising a control store having a read-only storage portion and a read-write storage portion, each portion organized in addressable microprogram sectors, and having a common address register and a common read-out register for said storage portions, a logical unit having a control input connected to an output of the read-out register, a status register controlled from said logical unit, and a control store address forming organization having control and data inputs from outputs of the read-out register and of the logical unit and having an output to said common address register, an addressing device comprising the combination of:

means controlled from the logical unit for writing into said status register a pointer code, a read-only storage sector address code and a read-write storage sector address code when, during execution of a task by the multi-microprogrammed unit, a microprogram in this addressed sector of the read-write storage portion must be substituted to a microprogram in this addressed sector of the read-only storage portion of the control store, means having an authorization input controlled by the said pointer code for comparing the sector address code in the address code outputting said organization to the read-only sector address code in said status register, and, means responsive to an identity condition output of said comparator means for substituting in the outputting code from said organization the read-write storage sector code of said status register to the read-only storage sector code in said outputting code for the said common address register.

2. Addressing device according to claim 1, wherein said sector address code substituting means comprises an address sector code transfer circuit having a first input connected to the output of the said organization, a second input connected to an output of the read-write sector address code of said status register, a condition switching control input connected to the output of the comparator means, and an output connected to the input of the said common address register of the control store.

3. Addressing device according to claim 1, wherein the read-write sector address code in the status register is zero and said sector address code substituting means comprises a gating circuit having an input to the sector address code output of said organization, an output to the said common address register and a gate blocking input to the output of said comparator means.

4. Addressing device according to claim 1, wherein said sector address code substituting means is provided with an inhibiting input and read-write sector address code detecting means has an input connected to an output of the sector address code from said organization and has an output connected to the said inhibiting input of the substituting means.

* * * * *